United States Patent
Li et al.

(10) Patent No.: US 10,608,232 B2
(45) Date of Patent: Mar. 31, 2020

(54) SECONDARY BATTERY AND BATTERY MODULE

(71) Applicant: Contemporary Amperex Technology Co., Limited, Ningde, Fujian (CN)

(72) Inventors: Quankun Li, Ningde (CN); Peng Wang, Ningde (CN); Taosheng Zhu, Ningde (CN); Baisong Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 160 days.

(21) Appl. No.: 15/894,779

(22) Filed: Feb. 12, 2018

(65) Prior Publication Data

US 2019/0067663 A1 Feb. 28, 2019

(30) Foreign Application Priority Data

Aug. 30, 2017 (CN) .......................... 2017 1 0766041

(51) Int. Cl.
*H01M 2/22* (2006.01)
*H01M 2/06* (2006.01)
(Continued)

(52) U.S. Cl.
CPC ................ *H01M 2/22* (2013.01); *H01M 2/04* (2013.01); *H01M 2/0469* (2013.01);
(Continued)

(58) Field of Classification Search
CPC ............ H01M 2/30; H01M 2/06; H01M 2/22
See application file for complete search history.

(56) References Cited

U.S. PATENT DOCUMENTS

2012/0237817 A1 9/2012 Kim
2017/0163059 A1 6/2017 Tamaru et al.
(Continued)

FOREIGN PATENT DOCUMENTS

| CN | 105591062 A | 5/2016 |
|---|---|---|
| CN | 105914304 A | 8/2016 |
| WO | 2018016747 A1 | 1/2018 |

OTHER PUBLICATIONS

The extended European search report dated Jul. 3, 2018 for European application No. 18155613.5, 9 pages.

*Primary Examiner* — Maria Laios
(74) *Attorney, Agent, or Firm* — Law Offices of Liaoteng Wang

(57) ABSTRACT

The present disclosure provides a secondary battery and a battery module. The secondary battery includes: a shell having an opening; an electrode assembly including a first electrode plate, a second electrode plate, and a separator; a cap assembly including a cap plate and a first electrode terminal; a lower insulator located at a side of the cap plate away from the terminal board; and a wiring board including a main body portion and an extension portion, wherein the main body portion is located at a side of the lower insulator away from the cap plate and connected to the first electrode plate, the extension portion extends into the electrode lead-out hole and connected to the first electrode terminal, the first electrode plate is electrically connected to the first electrode terminal through the wiring board, and the first electrode terminal does not extend beyond a lower surface of the lower insulator.

20 Claims, 7 Drawing Sheets

(51) Int. Cl.
    *H01M 2/04*           (2006.01)
    *H01M 2/30*           (2006.01)
    *H01M 2/20*           (2006.01)
    *H01M 10/42*         (2006.01)
    *H01M 10/052*        (2010.01)
    *H01M 2/26*           (2006.01)

(52) U.S. Cl.
    CPC ........... *H01M 2/0482* (2013.01); *H01M 2/06* (2013.01); *H01M 2/206* (2013.01); *H01M 2/30* (2013.01); *H01M 10/425* (2013.01); *H01M 2/263* (2013.01); *H01M 10/052* (2013.01); *H01M 2220/20* (2013.01)

(56) References Cited

U.S. PATENT DOCUMENTS

2017/0365839 A1\* 12/2017 Kawate .................. H01G 11/76
2018/0019459 A1\* 1/2018 Lobert ................ H01M 10/052

\* cited by examiner

SECONDARY BATTERY AND BATTERY MODULE

CROSS REFERENCE TO RELATED APPLICATION

The present application is based upon and claims the benefits of Chinese Patent Application No. 201710766041.5 filed on Aug. 30, 2017, the entire contents of which are incorporated herein by reference.

FIELD

The present disclosure relates to the technical field of energy storage devices, and in particular, to a secondary battery and a battery module.

BACKGROUND

New energy vehicles are widely promoted in the country and even in the world. However, in order to completely replace fuel vehicles, there are many areas for improvement. For example, there are a few problems such as low travelling mileages of vehicles, high cost of battery packs, reliability of battery packs and the like, which need to be further solved. In view of these problems, higher requirements have been proposed for a power battery as a core part of an electric vehicle, such as higher energy density, lower cost and so on.

Currently, the power battery generally has a quadrate hard-shell structure. Housing of the power battery includes a shell and a cap assembly. The housing of the power battery provides a sealed space to accommodate an electrode assembly and electrolyte. The power of the electrode assembly is directed to outside of the sealed space from inside of the sealed space through a terminal of the cap assembly. In the existing cap assembly, cap plate is a metal plate and a through hole is disposed thereon. The terminal is divided into a base portion and an extension portion, and the base portion has a cross-sectional area larger than that of the through hole. During assembly, the base portion is located below the cap plate (i.e., inside the shell). After the extension portion passes through the through hole, the extension portion is fixed by a snap spring or a rivet connection. In this way, the terminal is fixed to the cap plate. As the base portion is located inside the shell, space utilization within the shell is reduced, and as a result, the energy density of the power battery is reduced. Moreover, as it is required to provide the terminal with a base portion and a long extension portion, the terminal may not be directly press-molded, and instead, the terminal is required to be molded individually by a respective machine, so that manufacturing cost of the terminal increases.

In addition, the base portion inside the shell is provided with a certain thickness, usually 1.5 to 4 mm, in order to connect the terminal to the wiring board inside the battery shell, thus the space utilization in the battery shell is reduced and the manufacturing cost is increased.

Therefore, there is a need for a new secondary battery and a new battery module.

SUMMARY

According to an aspect of the embodiments of the present disclosure, a secondary battery is provided. The secondary battery includes: a shell having an opening; an electrode assembly which is accommodated in the shell, wherein the electrode assembly includes a first electrode plate, a second electrode plate, and a separator disposed between the first electrode plate and the second electrode plate; a cap assembly including a cap plate and a first electrode terminal, wherein the cap plate covers the opening and has an electrode lead-out hole, and the first electrode terminal includes a terminal board, and wherein the terminal board is located at a side of the cap plate and covers the electrode lead-out hole; a lower insulator located at a side of the cap plate away from the terminal board; and a wiring board which includes a main body portion and an extension portion connected to the main body portion, wherein the main body portion is located at a side of the lower insulator away from the cap plate and connected to the first electrode plate, and the extension portion extends into the electrode lead-out hole and connected to the first electrode terminal, and wherein the first electrode plate is electrically connected to the first electrode terminal through the wiring board, and the first electrode terminal does not extend beyond a surface of the lower insulator away from the cap plate in a direction from the cap plate to the lower insulator.

According to an aspect of the embodiments of the present disclosure, the main body portion is sheet-like and extends in a direction parallel to the cap plate, the extension portion includes a protrusion disposed at a side of the main body portion close to the cap plate, and the protrusion is connected to the first electrode terminal.

According to an aspect of the embodiments of the present disclosure, the main body portion and the extension portion are in an integral structure, and a concave portion is formed at a side of the main body portion away from the cap plate by forming the protrusion.

According to an aspect of the embodiments of the present disclosure, the protrusion includes a top wall and an annular side wall connected to the top wall such that the concave portion is open at a side of the main body portion away from the cap plate.

According to an aspect of the embodiments of the present disclosure, the protrusion includes a top wall and two side walls which are connected to the top wall and opposite to each other such that the concave portion is open at a side of the main body portion away from the cap plate and open at two sides that are adjacent to this side and opposite to each other.

According to an aspect of the embodiments of the present disclosure, the protrusion includes a top wall and a side wall connected with the top wall, such that the concave portion is open at a side of the main body portion away from the cap plate and open at three sides adjacent to this side.

According to an aspect of the embodiments of the present disclosure, the main body portion includes a base plate and a wing plate extended from an edge of the base plate, wherein the base plate is connected to the first electrode plate, and the extension portion is disposed on the wing plate.

According to an aspect of the embodiments of the present disclosure, the main body portion and the extension portion are in separate structures, and the extension portion further includes a conductive block, wherein the conductive block has a solid structure and is welded with the main body portion and the terminal board.

According to an aspect of the embodiments of the present disclosure, the first electrode terminal is composed of the terminal board, and wherein the terminal board is plate-like.

According to an aspect of the embodiments of the present disclosure, thickness of the terminal board is greater than that of the extension portion, the terminal board and the extension portion are connected by laser welding which forms a weld joint, and the weld joint does not exceed beyond a surface of the terminal board away from the cap plate in a direction from the cap plate to the terminal board.

According to an aspect of the embodiments of the present disclosure, the secondary battery further includes a sealing member which is provided between the terminal board and the cap plate.

According to an aspect of the embodiments of the present disclosure, the first electrode terminal further includes a boss connected with the terminal board, and wherein the boss extends into the electrode lead-out hole and is welded with the extension portion.

According to an aspect of the embodiments of the present disclosure, the secondary battery further includes a fixing member and a connecting member, wherein the fixing member is fixed to the cap plate through the connecting member, and an outer peripheral surface of the first electrode terminal is at least partially surrounded by the fixing member to fix the first electrode terminal to the fixing member.

According to an aspect of the embodiments of the present disclosure, the connecting member includes a nail body and a limiting portion which are connected with each other, an outer peripheral surface of the limiting portion protrudes from an outer peripheral surface of the nail body, an end of the nail body far away from the limiting portion is fixed on the cap plate, and the limiting portion is engaged with the fixing member.

According to an aspect of the embodiments of the present disclosure, the connecting member includes a first connecting plate, a part of the first connecting plate is embedded in the fixing member and engaged with the fixing member, and another part of the first connecting plate is welded with the cap plate.

According to an aspect of the embodiments of the present disclosure, the connecting member includes an undercut and an undercut hole, wherein the undercut hole is provided on a surface of the cap plate facing the fixing member, and aperture of the undercut hole is increased along a direction from the fixing member to the cap plate, the undercut is connected with the fixing member and is in form-fitting with the undercut hole, and the undercut is fitted with the undercut hole.

According to an aspect of the embodiments of the present disclosure, the first electrode plate includes a coating area coated by active materials and a first electrode tab extending from the coating area, and the first electrode tab is bent and connected with the main body portion.

According to an aspect of the embodiments of the present disclosure, the secondary battery further includes a first insulator, wherein the first insulator includes a body portion, a first engaging portion, and a second engaging portion, and wherein the first engaging portion is located at a side of the body portion close to the terminal board, the second engaging portion is located at a side of the body portion away from the first engaging portion, the body portion is accommodated in the electrode lead-out hole, the first engaging portion is fitted with the cap plate to fix the first engaging portion to the cap plate, and the lower insulator is provided with a through hole, the first insulator passes through the through hole, the second engaging portion is located at a side of the lower insulator away from the cap plate, and an outer peripheral surface of the second engaging portion protrudes from an inner wall of the through hole to fix the lower insulator to the first insulator.

According to an aspect of the embodiments of the present disclosure, the first engaging portion has a groove, a flange is provided at a side of the cap plate facing the first engaging portion, and the groove is fitted with the flange.

According to an aspect of the embodiments of the present disclosure, the wiring board is composed of the main body portion the extension portion connected to the main body portion.

According to another aspect of the embodiments of the present disclosure, there is also provided a battery module including a busbar and the secondary battery described above, wherein the busbar is welded to the terminal board.

BRIEF DESCRIPTION OF THE DRAWINGS

The present disclosure may be better understood from the following descriptions of specific embodiments of the present disclosure by taken in conjunction with the accompanying drawings, in which.

Other features, objects, and advantages of the present disclosure will become more apparent by reading the following detailed descriptions of non-limiting embodiments with reference to the accompanying drawings, in which the same or similar reference signs denote the same or similar features.

REFERENCE LABELS IN THE FIGURES

Figure 1:
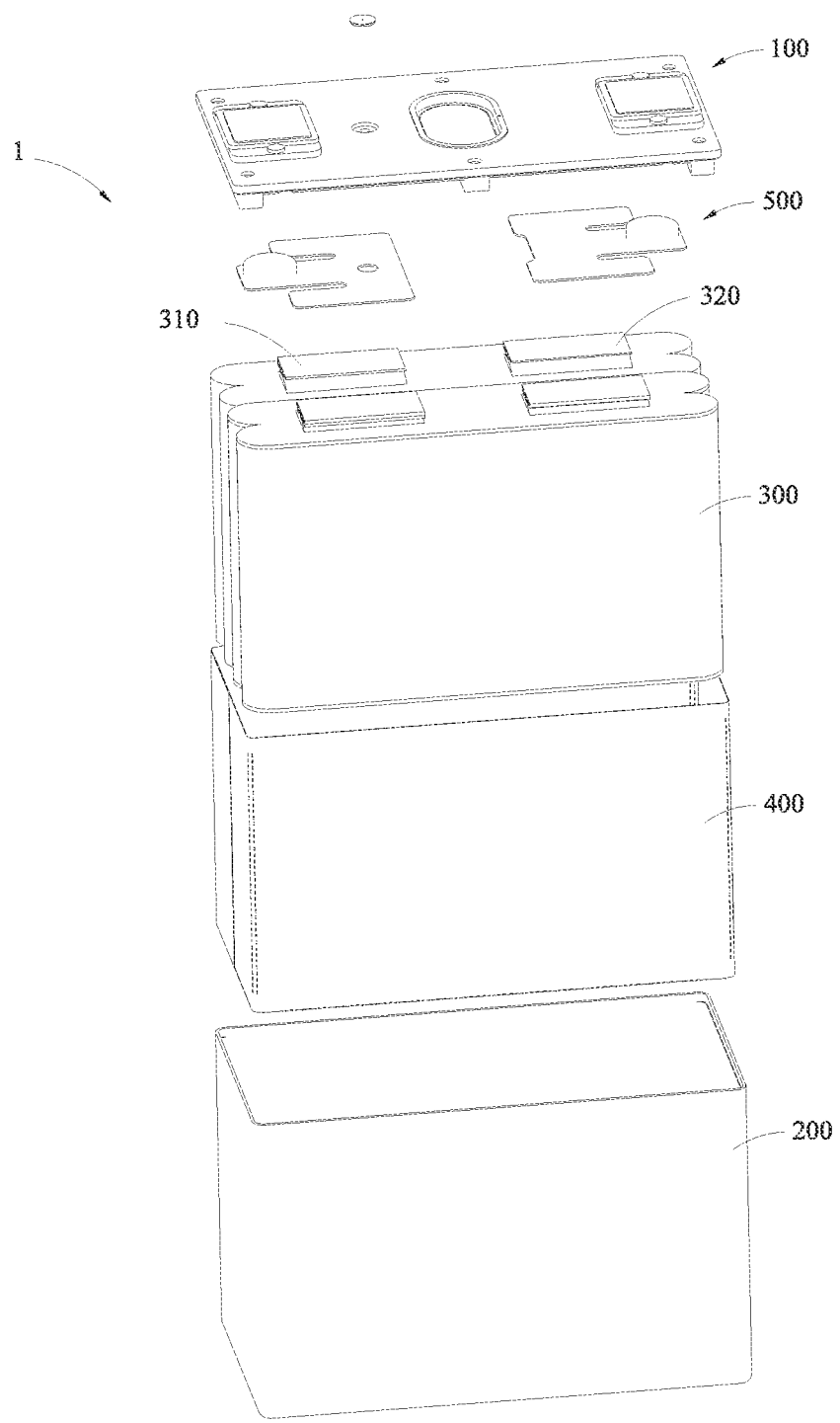
FIG. 1 is a schematic exploded diagram of a structure of a secondary battery according to an embodiment of the present disclosure.

1—Secondary battery
100—Cap assembly
101—Cap assembly
10—Cap plate
11—Electrode lead-out hole
12—Riveting member
121—Nail body;
122—Limiting portion
13—Second groove
14—Accommodation groove 15—Liquid injection hole
16—Anti-explosion valve assembly
20—Terminal assembly
21—Terminal board
22—Fixing member
221—Accommodation space
222—Via hole
223—Connection hole
224—Rabbet
23—Sealing member
24—Stopper
25—First connecting plate
30—Terminal assembly
31—Terminal board
32—Fixing member
33—Sealing member
34—Stopper
40—Lower insulator
41—First insulator
411—First engaging portion
412—Second engaging portion
42—Second connecting plate
200—Shell
300—Electrode assembly
310—First electrode tab
320—Second electrode tab
400—Insulating protection layer
500—Wiring board
501—Wiring board
502—Wiring board
510—Main body portion
511—Base plate
512—Wing plate
520—Extension portion
530—Conductive block

DETAILED DESCRIPTION

The features and exemplary embodiments of the various aspects of the present disclosure will be described in detail below. In the following detailed description, numerous specific details are set forth in order to provide a thorough understanding of the present disclosure. It will be apparent, however, to those skilled in the art that the present disclosure may be practiced without some of these specific details. The following description of embodiments is only provided by illustrating examples for a better understanding of the present disclosure. In the drawings and the following description, at least a part of well-known structures and techniques are not shown in order to avoid unnecessarily obscuring the present disclosure. Further, for clarity, the size of a part of the structures may be exaggerated. The same reference numerals in the drawings denote the same or similar structures, and thus their detailed description will be omitted. Furthermore, the features, structures, or characteristics described below can be combined in any suitable manner in one or more embodiments.

The terms denoting directions that appear in the following description indicate directions shown in the drawings, and do not limit specific structures of the secondary battery of the present disclosure. In the description of the present disclosure, it should also be noted that the terms "mounted", "connected" and "connection" should be interpreted in a broad sense unless explicitly defined and limited otherwise. For example, it may indicate "fixed connection", "disassemble connection" or "integral connection"; it may indicate a direct connection or an indirect connection. For those skilled in the art, specific meanings of the above terms in the present disclosure may be understood depending on specific situations.

Charge and discharge of the secondary battery provided by the embodiments of the present disclosure may be perform cyclically so as to facilitate repeated use of the secondary battery. Further, the secondary battery in the embodiments of the present disclosure can reduce the occupancy of the internal space of the shell, and thus the energy density of the secondary battery can be increased. In addition, the structure of the secondary battery is simple and easy to produce. As a result, the production efficiency of the secondary battery is increased and the production cost thereof is reduced effectively.

For a better understanding of the present disclosure, a secondary battery according to embodiments of the present disclosure will be described in detail below with reference to FIG. 1 to FIG. 11.

FIG. 1 is a schematic exploded diagram of a structure of a secondary battery 1 according to an embodiment of the present disclosure. As shown in FIG. 1, the secondary battery 1 may generally include a cap assembly 100, a shell 200, and an electrode assembly 300, an insulating protection layer 400 and a wiring board 500 which are inside the shell 200.

According to an embodiment of the present disclosure, the shell 200 may be made of a metal material, such as aluminum, aluminum alloy, or nickel-plated steel. The shell 200 is formed in a rectangular box shape and has an opening to its inside accommodation space The electrode assembly 300 may be formed by stacking or winding a first electrode, a second electrode, and a separator together, where the separator is an insulator interposed between the first electrode and the second electrode. In this embodiment, as an example, the description will be provided by taking the first electrode as a positive electrode plate and the second electrode as a negative electrode plate. Similarly, in other embodiments, the first electrode may be a negative electrode plate, and the second electrode may be a positive electrode plate. In addition, active materials for the positive electrode plate may be coated on a coating area of the positive electrode plate, and active materials for the negative electrode plate may be coated on a coating area of the negative electrode plate. A portion extending from the coating area of the positive electrode plate is referred to as a positive electrode tab, i.e., the first electrode tab 310; and a portion extending from the coating area of the negative electrode plate is referred to as a negative electrode tab, i.e., the second electrode tab 320.

The insulating protection layer 400 is a thin-film-like mask made of an insulating material. The insulating protection layer 400 is formed to have an accommodation space fitted with the outline of the electrode assembly 300 so that the electrode assembly 300 and the inner wall of the shell 200 are electrically insulated by covering the periphery of the electrode assembly 300 with the insulating protection layer 400. In addition, an insulating layer may be provided on the inner surface of the shell 200 instead of the insulating protection layer 400.

Figure 2:
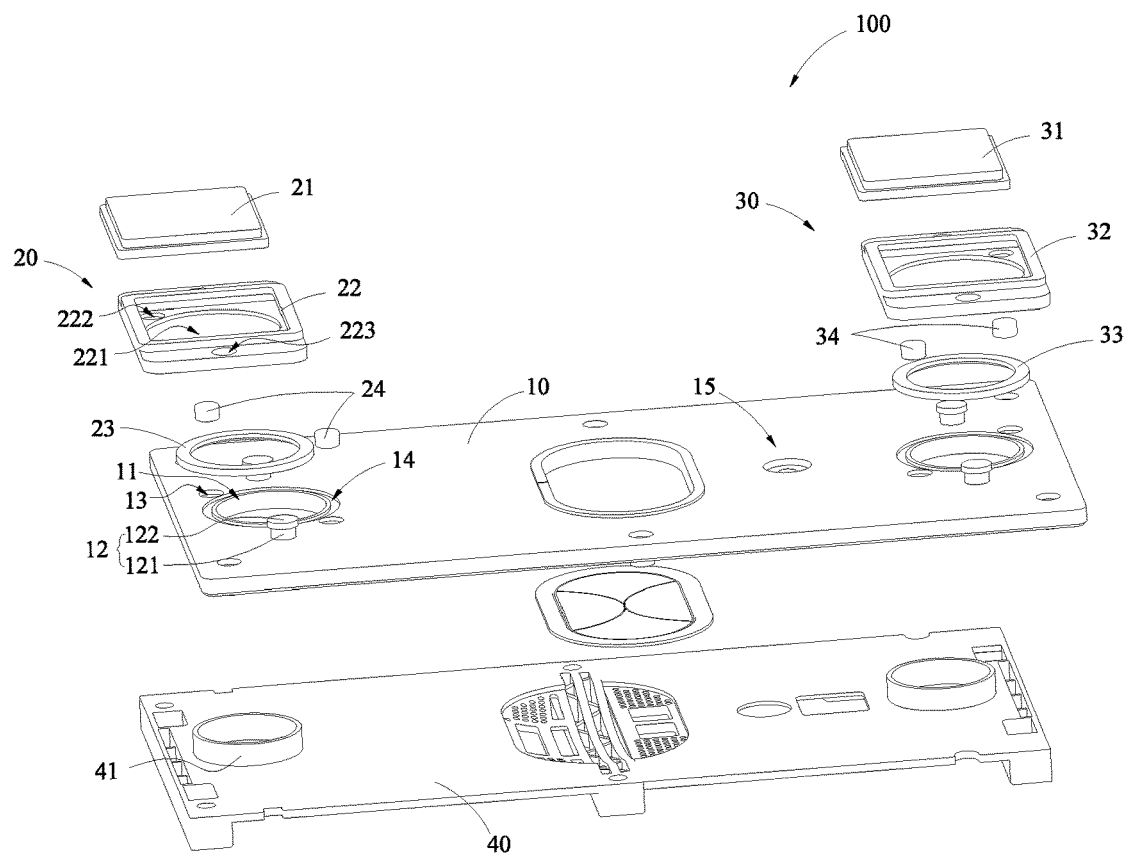
FIG. 2 is a schematic exploded diagram of a structure of a cap assembly for the secondary battery in FIG. 1.
Figure 3:
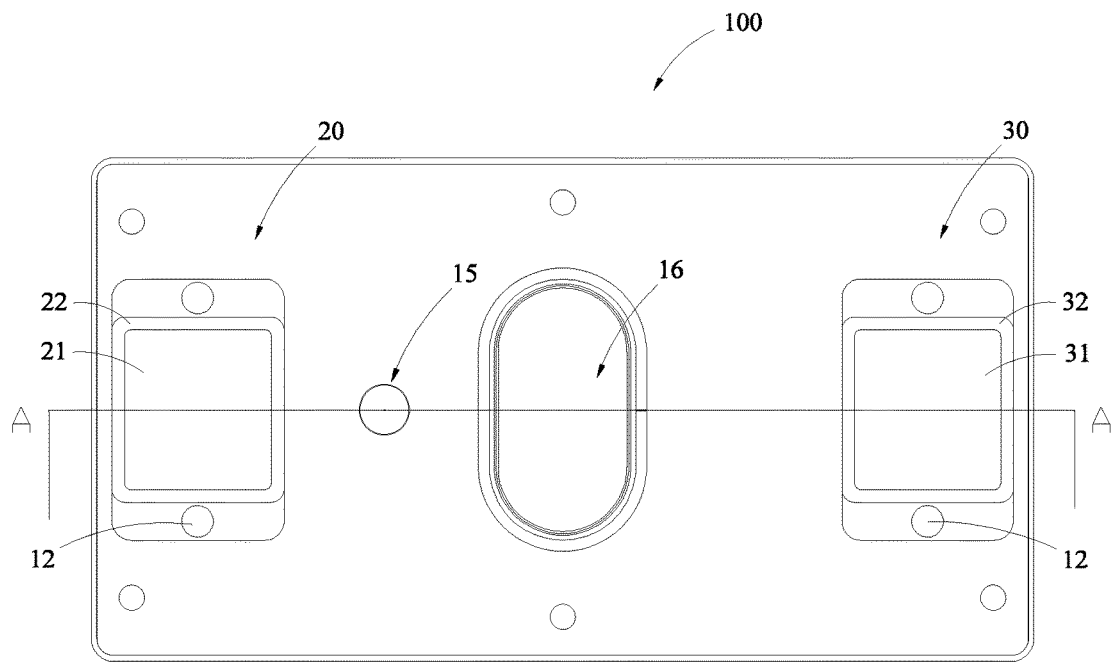
FIG. 3 is a schematic top view of the structure of the secondary battery in FIG. 1.
Figure 4:
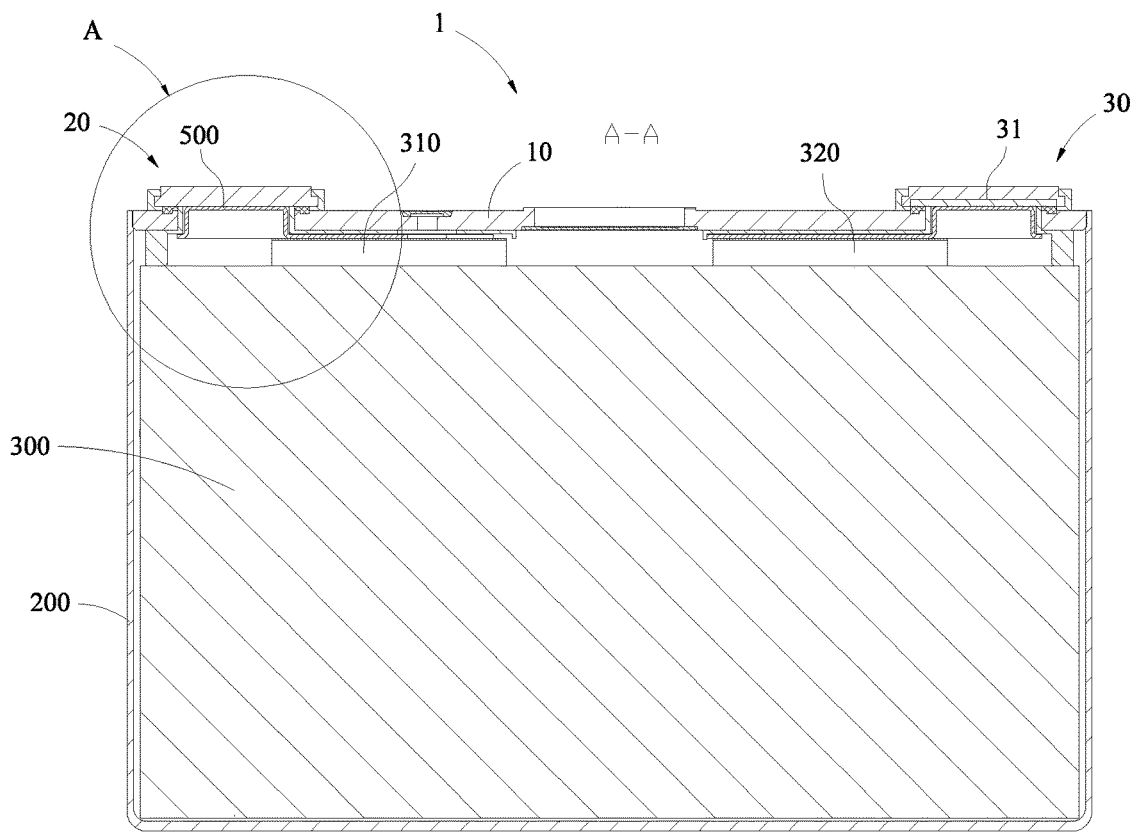
FIG. 4 is a schematic cross-sectional diagram of the structure of the secondary battery in FIG. 3 taken along a section line A-A.

FIG. 2 is a schematic exploded diagram of a structure of a cap assembly 100 for the secondary battery 1 in FIG. 1; FIG. 3 is a schematic top view of the structure of the secondary battery 1 in FIG. 1; and FIG. 4 is a schematic cross-sectional diagram of the structure of the secondary battery 1 in FIG. 3 taken along a section line A-A. As shown in FIG. 2 to FIG. 4, the cap assembly 100 is used to seal the shell 200 in order to seal the electrode assembly 300 within the shell 200. The cap assembly 100 includes a cap plate 10, a terminal assembly 20, a terminal assembly 30, and a lower insulator 40.

The cap plate 10 is in the shape of a thin plate and has a size and shape matched with the opening of the shell 200 so as to be capable of being connected at the opening of the shell 200. The cap plate 10 is made of a metal material, for example, the same metal material as that of the shell 200. In the embodiment, the cap plate 10 is provided with the electrode lead-out hole 11, a riveting member 12, a second groove 13, an accommodation groove 14, a liquid injection hole 15 and an anti-explosion valve assembly 16.

As shown in FIG. 2 and FIG. 3, the liquid injection hole 15 is formed on the cap plate 10 in a predetermined size, so that the electrolyte can be injected into the shell through the liquid injection hole 13 after the cap plate 10 covers the opening of the shell and is hermetically connected with the shell. The anti-explosion valve assembly 16 may have a conventional structure (for example, by providing a rupture disc) and may be disposed at a substantially central position of the cap plate 10. When the gas pressure inside the secondary battery becomes too large as a result of over-charging, over-discharging, or over-heating of the secondary battery, the rupture disc in the anti-explosion valve assembly 16 may be broken so that the gas produced inside the secondary battery may be exhausted to the outside via a through hole of the anti-explosion valve assembly 16, thereby being able to prevent the secondary battery from exploding.

With continued reference to FIG. 2 to FIG. 4, the cap plate 10 is provided with two electrode lead-out holes 11 for lead electric energy in the electrode assembly 300 inside the shell 200 out to the outside of the cap plate 10. In an exemplary embodiment, the terminal assembly 20 may generally include a first electrode terminal, a fixing member 22, and a sealing member 23. Similarly, the terminal assembly 30 may generally include a second electrode terminal, a fixing member 32, and a sealing member 33. Only the structure of the terminal assembly 20 and its mounting on the cap plate 10 are described as an example below. Further, the following description will be provided in such an exemplary way that the terminal assembly 20 is a terminal assembly at the positive electrode and the terminal assembly 30 is a terminal assembly at the negative electrode.

The first electrode terminal may include a terminal board 21. The terminal board 21 has a square (or circular) sheet or plate structure and is fixed to the fixing member 22 in such a way that its outer peripheral surface is at least partially surrounded by the fixing member 22. Then the terminal board 21 is fixed onto the cap plate 10 through the fixing member 22. In an example, the fixing member 22 is a plastic member and may be engaged on the outer peripheral surface of the terminal board 21 by an integral injection molding process. In an optional embodiment, the first electrode terminal may has a plate-like structure and the surface of the first electrode terminal close to the cap plate 10 does not exceed beyond the surface of the cap plate 10 close to the first electrode terminal (i.e., the first electrode terminal is composed of the terminal board 21, and the first electrode terminal does not stretch into the electrode lead-out hole 11).

In an exemplary embodiment, the fixing member 22 is a hard plastic member. "Hard" herein refers to the fixing member is required to have a certain strength so that the fixing member is able to fix the first electrode terminal on the cap plate 10 to seal the electrode lead-out hole 11 by the sealing member 33. For example, the fixing member 22 may be made of a high-temperature-resistant insulating plastic material such as one or more of polyphenylene sulfide (PPS), perfluoroalkoxy resin (PEA) or polypropylene (PP), so that fastening force between the fixing member 22 and the cap plate 10 may be ensured while the fixing member 22 is closely fitted with the first electrode terminal.

Figure 5:
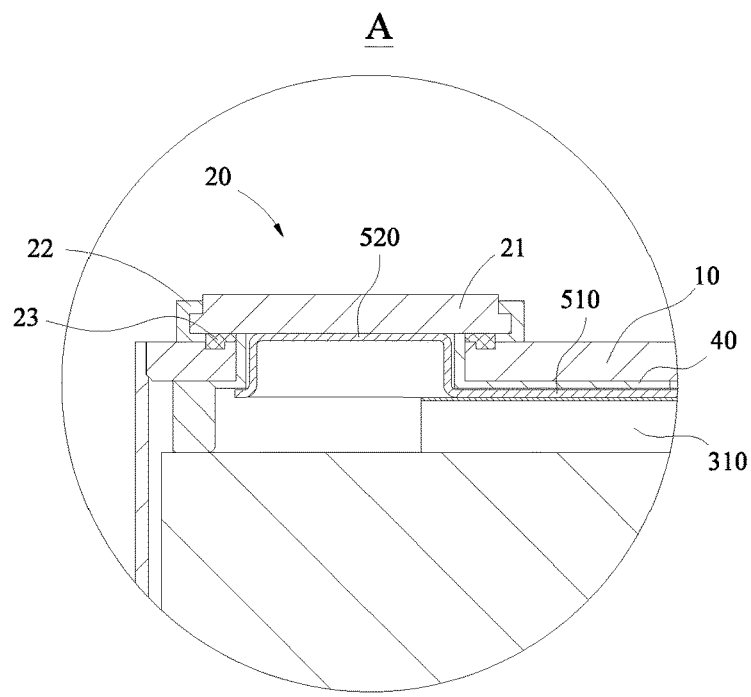
FIG. 5 is an enlarged partial view of a portion A in FIG. 4.

FIG. 5 is an enlarged partial view of a portion A of the secondary battery 1 in FIG. 4. As shown in FIG. 2 to FIG. 5, specifically, the fixing member 22 has an accommodation space 221 in form-fitting with the terminal board 21, so as to contain the terminal board 21 in the accommodation space 221 and be affixed to the terminal board 21. In this case, a part of the fixing member 22 is clamped between the terminal board 21 and the cap plate 10. In order to increase the fastening force for bonding the terminal board 21 and the fixing member 22 to each other, an annular convex portion is provided on the outer peripheral surface of the terminal board 21. Correspondingly, an annular concave portion for accommodating the annular convex portion is provided on an inner wall of the fixed member 22 being affixed to the terminal board 21. When the terminal board 21 is placed in the accommodation space 221 of the fixing member 22, the annular convex portion and the annular concave portion form an engaging structure with each other so that the terminal board 21 can be firmly connected in the fixing member 22. Alternatively, an accommodation space adapted to the shape of the terminal board 21 may also be formed between the fixing member 22 and the cap plate 10 for accommodating the terminal board 21 (in this case, the fixing member 22 does not have a portion clamped between the terminal board 21 and the cap plate 10). Of course, the fixing as mentioned herein means that the terminal board 21 may not have movements in the thickness direction relative to the fixing member 22.

After the first electrode terminal and the fixing member 22 are connected to each other, the terminal board 21 covers the electrode lead-out hole 11 and the outer peripheral surface of the terminal board 21 protrudes from the inner wall of the electrode lead-out hole 11 (that is, as shown in FIG. 4, the cross-sectional dimension of the terminal board 21 is larger than that of the electrode lead-out hole 11). Also, the surface of the terminal board 21 away from the cap plate 10 protrudes from the surface of the fixing member 22 away from the cap plate 10 (that is, as shown in FIG. 5, the upper surface of the terminal board 21 is higher than that of the fixing member 22). Meanwhile, a through hole is disposed at a side of the fixing member 22 close to the cap plate 10 so that the terminal board 21 can be exposed out of the inside of the shell 200 through the through hole and thus be electrically connected with the electrode assembly 300.

Since the first electrode terminal is connected to a busbar (not shown in the figure) through the surface of the terminal board 21 away from the cap plate 10, contact area between the electrode terminal and the busbar can be increased when a plurality of secondary batteries 1 are connected in series or in parallel. Therefore, it is possible to improve the overcurrent capability of the first electrode terminal. And since the outer peripheral surface of the terminal board 21 protrudes from the inner wall of the electrode lead-out hole 11, the terminal assembly 20 is required to be assembled from the top to the bottom when it is assembled. Thus the terminal board 21 can be fixed only by the fixing member 22 without an additional fixing structure provided on the terminal board 21 itself, and then the structure of the first electrode terminal can be simplified. Compared with the conventional terminal structure of the cap plate for the secondary battery, the first electrode terminal with the plate structure in an embodiment of the present disclosure can be processed in batch by blanking, thus production efficiency can be increased and production cost can be reduced. The space inside the shell 200 will not be occupied, and thus the energy density of the secondary battery 1 can be increased effectively.

In order to maintain the insulation between the cap plate 10 and the electrode assembly 300 inside the shell 200 and between the cap plate 10 and the wiring board 500 inside the shell 200, the lower insulator 40 is generally made of a plastic material and substantially plate-like in shape. The lower insulator 40 is located on the surface of the cap plate 10 facing the inside of the shell 200. The lower insulator 40 includes two through holes and two first insulators 41 disposed around the respective through holes. The two through holes are respectively opposite to the two electrode lead-out holes 11 disposed on the cap plate 10, and the first insulators 41 are disposed to surround the circumferential edges of the through holes respectively. Description will be made for one of the two first insulators 41 below In this embodiment, the first insulator 41 is annular and integrally formed with the lower insulator 40. The first insulator 41 is fitted with the electrode lead-out hole 11 in size, so that the lower insulator 40 may be connected to the cap plate 10 by interference fitting between the first insulator 41 and the electrode lead-out hole 11 when the first insulator 41 is inserted into the electrode lead-out hole 11. Further, an end face of the body portion of the first insulator 41 close to the first electrode terminal is protruded from a surface of the cap plate 10 close to the first electrode terminal. With continued reference to FIG. 2, in an embodiment of the present disclosure, the fixing member 22 is fixed to the cap plate 10 through a connecting member. The connecting member for fixing the fixing member 22 may include a riveting member 12 which includes a nail body 121 and a limiting portion 122. One end of the nail body 121 is connected to an upper surface of the cap plate 10 (i.e., a surface of the cap plate 10 away from the inside of the shell), and the other end of the nail body 121 is connected to the limiting portion 122. An outer peripheral surface of the limiting portion 122 protrudes out of an outer peripheral surface of the nail body 121 (i.e., the cross-sectional area of the limiting portion 122 is greater than that of the nail body 121). Two opposite sides of the fixing member 22 respectively extend outward to form extending edges, and at least one connection hole 223 is provided at each extending edge. The aperture of the connection hole 223 is adapted to the size of the nail body 121 of the riveting member 12.

In a specific implementation, the riveting member 12 may fix the fixing member 22 onto the cap plate 10 in the following ways. In a specific example, the nail body 121 may be integrally disposed on the cap plate 10. After the nail body 121 passes through the connection hole 223 provided on the fixing member 22, a force is applied at an end of the nail body 121 away from the cap plate 10 until the limiting portion 122 is formed at the end of the nail body 121 and the limiting portion 122 and the surface of the fixing member 22 away from the cap plate 10 are engaged against each other to fix the fixing member 22 onto the cap plate 10.

In another specific example, the nail body 121 and the limiting portion 122 may be formed as an integral structure. The nail body 121 is provided with a screw thread structure, and correspondingly, the cap plate 10 is provided with a screw thread hole fitted with the screw thread structure of the nail body 121. As such, after the nail body 121 passes through the connection hole 223 provided on the fixing member 22, the limiting portion 122 and the surface of the fixing member 22 away from the cap plate 10 may be engaged against each other, and the fixing member 22 may be fixed on the cap plate 10 through the fastening of the screw thread structure of the nail body 121 into the corresponding screw thread hole on the cap plate 10.

In addition, in yet another specific example, the fixing member 22 may be directly formed on the cap plate 10 having the riveting member 12 by an integral injection molding process, so that the riveting member 12 may be directly wrapped inside the fixing member 22 and engaged with the fixing member 22 so as to fix the fixing member 22 onto the cap plate 10. Moreover, the integral injection molding process may not cause any damage to the structure of the fixing member 22.

Figure 6:
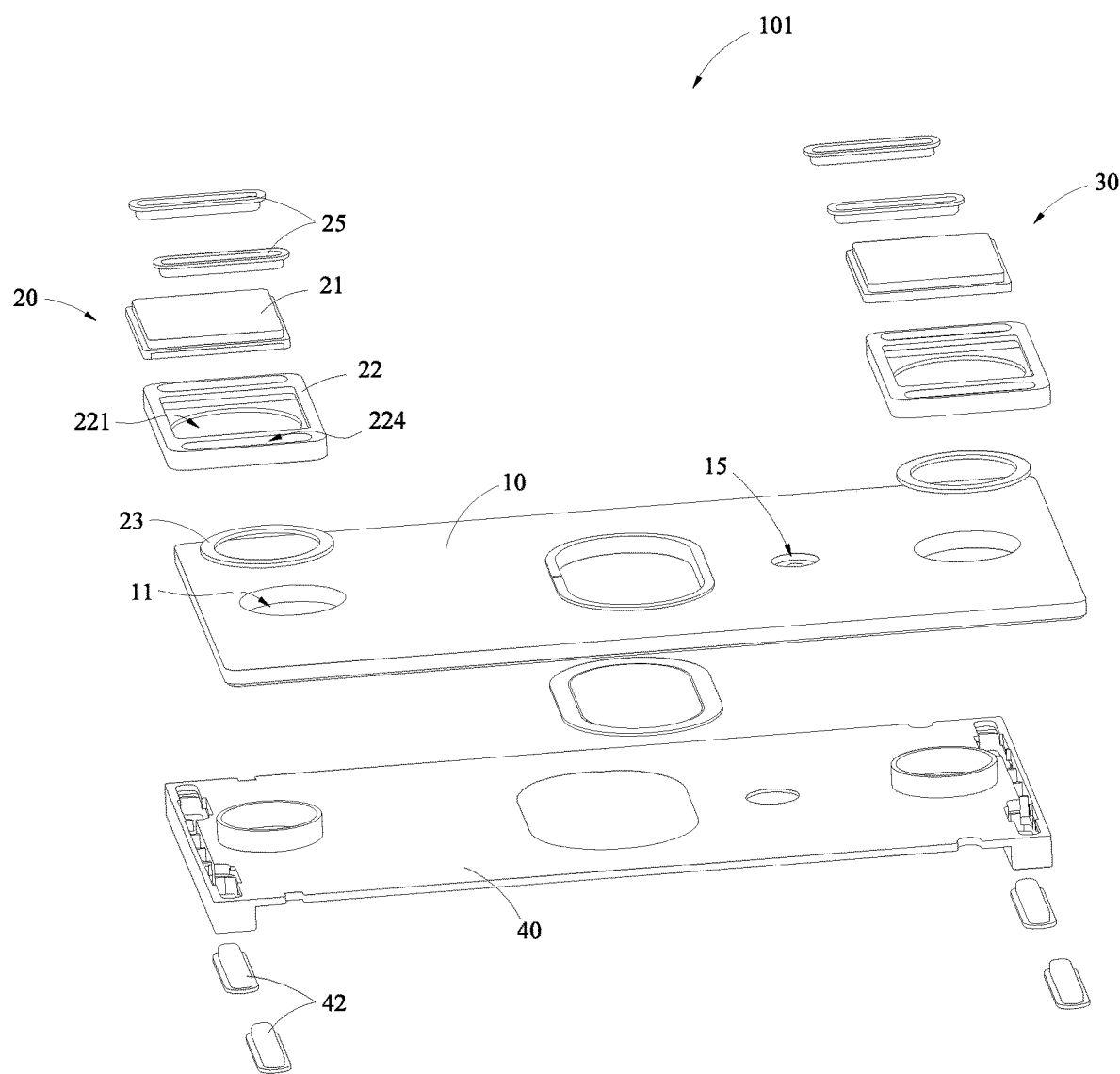
FIG. 6 is a schematic exploded diagram of a structure of a cap assembly according to another embodiment of the present disclosure.

FIG. 6 is a schematic exploded diagram of a structure of a cap assembly 101 according to another embodiment of the present disclosure. As shown in FIG. 6, the structure of the cap assembly 101 in this embodiment is similar to that of the cap assembly 100 in the above embodiment. Therefore, in the present embodiment, same reference numbers are used for the same components as those in the cap assembly 100. Further, the structures and connections that have been described in the above embodiments will not be described again.

In an optional embodiment, the connecting member for fixing the fixing member 22 may further include a first connecting plate 25. Specifically, the first connecting plate 25 is made of a metal material and includes an engagement portion and a contact portion connected with the engagement portion. The contact portion has a prismatic structure and has a recessed portion formed at a side of the contact portion. The engagement portion is a flange formed at an edge of the recessed portion.

Each of the two opposite extending edges of the fixing member 22 is provided with a notch 224. The notch 224 is provided with a groove on two opposite side walls thereof in the longitudinal direction for accommodating the engagement portion of the first connecting plate 25, so that the engagement portion of the first connecting plate 25 may be inserted into the groove of the notch 224 and the contact portion of the first connecting plate 25 may be exposed out of the notch 224 and contact with the cap plate 10. Thus, the contact portion of the first connecting plate 25 may be welded to the cap plate 10, and then the fixing member 22 can be fixed to the cap plate 10 through the first connecting plate 25. By providing the recessed portion on the contact portion of the first connecting plate 25, the laminated thickness of the contact portion and the cap plate 10 can be reduced so as to facilitate the welding connection between the first connecting plate 25 and the cap plate 10. In an optional embodiment, the upper surface of the contact portion and the upper surface of the cap plate are substantially in a same level. In this case, a butt-seam welding may be adopted.

In addition, in this embodiment, for example, the lower insulator 40 may also be welded to a side of the cap plate 10 facing the inside of the shell by using a second connecting plate 42. The specific manner of connecting the lower insulator 40 to the cap plate 10 through the second connecting plate 42 is the same as that of connecting via welding the fixing member 22 to the cap plate 10 through the first connecting plate 25 as above mentioned, which will not be described again.

In an optional embodiment, the connecting member may be an undercut integrally formed on the fixing member 22. Correspondingly, an undercut hole (not shown in the figure) adapted to the undercut is provided on the cap plate 10. Specifically, a plurality of undercut holes may be disposed around the electrode lead-out hole 11. The aperture of the undercut hole increases along the direction from the fixing member 22 to the cap plate 10. That is to say, the aperture of the undercut hole gradually decreases along the direction from the bottom to the opening of the undercut hole. Correspondingly, a surface of the fixing member 22 facing the cap plate 10 is provided with the undercut adapted to the shape of the undercut hole. Thus, the fixing member 22 can be fixed to the cap plate 10 by the engagement between the undercut provided on the fixing member 22 and the undercut hole provided on the cap plate 10. Of course, the increasing of the aperture of the undercut hole mentioned herein does not require that the aperture of the undercut hole regularly increases along the direction from the fixing member 22 to the cap plate 10, but means that the aperture of one end of the undercut hole far away from the fixing member 22 is larger than that of the other end of the undercut hole close to the fixing member 22. In other words, the aperture of the bottom of the undercut hole is larger than the aperture of the top of the undercut hole.

Of course, the specific structure of the fixing member 22 will not be limited in the embodiments of the present disclosure. In other embodiments, in case that the first electrode terminal is circular or in other shapes, the fixing member 22 is only required to be provided with an accommodating space adapted to the shape of the first electrode terminal. In addition, the riveting member 12 may be disposed at a side of the cap plate 10 away from the fixing member 22, so that the cap plate 10 can be connected to the lower insulator 40 through the riveting member 12 in a manner of connection with the fixing member 22.

In an optional embodiment, the terminal assembly 20 may further include an anti-rotation component. As shown in FIG. 2, in the present embodiment, the anti-rotation component of the terminal assembly 20 is a stopper 24, and the anti-rotation component of the terminal assembly 30 is a stopper 34. The terminal assembly 20 will be described as an example below. Specifically, the terminal assembly 20 may include two stoppers 24, and the two stoppers 24 are cylindrical. Two first grooves are provided on a surface of the first electrode terminal facing the cap plate 10, and two via holes 222 are provided on the fixing member 22 adapted to the first grooves. Two second grooves 13 opposite to the via holes 222 are provided on a surface of the cap plate 10 facing the first electrode terminal. The two stoppers 24 pass through the two via holes 222 of the fixing member 22 and respectively engage with two first grooves and two second grooves 13. In this way, the first electrode terminal and the fixing member 22 may be positioned on the cap plate 10 by two fixing points formed by the two stoppers 24, so as to prevent the first electrode terminal and the fixing member 22 from moving along the surface of the cap plate 10 relative to the cap plate 10. Furthermore, it is also possible to prevent the first electrode terminal and the fixing member 22 from moving relative to each other. Thus, the anti-rotation component may also ensure stability of the engagement between the first electrode terminal and the fixing member 22 and prevent stability of the structure of the terminal assembly 20 from being affected due to the first electrode terminal and the fixing member 22 being separated from each other. Of course, the number of the stoppers 24 is not limited to the embodiments of the present disclosure. In other embodiments, the terminal assembly 20 may also include more stoppers 24. Of course, in some embodiments, the stopper 24 and the cap plate 10 are in an integral structure, or the stopper 24 and the terminal board 21 are in an integral structure.

In addition, the specific structure of the anti-rotation component and the engagement manner between the anti-rotation component and the first electrode terminal and between the anti-rotation component and the cap plate 10 are not limited in the embodiments of the present disclosure. For example, in other embodiments, the anti-rotation component may further include other protrusion structures and groove structures fitted with each other that are disposed between the first electrode terminal and the fixing member 22 and between the fixing member 22 and the cap plate 10. In addition, since both the first electrode terminal and the fixing member 22 are square, it is also possible to provide the anti-rotation member correspondingly only between the fixing member 22 and the cap plate 10 so as to limit the rotation of the fixing member 22 relative to the cap plate 10.

With continued reference to FIG. 2 to FIG. 5, specifically, according to an embodiment of the present disclosure, the sealing member 23 is disposed between the terminal board 21 of the first electrode terminal and the cap plate 10. In an optional embodiment, the sealing member 23 has an annular shape, and the surface of the sealing member 23 facing the cap plate 10 is formed in a step-structure. That is, the surface of the sealing member 23 facing the cap plate 10 is provided with an annular protrusion. The cap plate 10 is provided with an annular accommodation groove 14 which is surrounded the electrode lead-out hole 11. The annular protrusion of the sealing member 23 may be fitted in the accommodation groove 14 (as shown in FIG. 5) to position the sealing member 23 by the accommodation groove 14, so as to prevent the sealing member 23 from moving between the terminal board 21 of the first electrode terminal and the cap plate 10. Of course, the accommodation groove 14 may also be disposed on the surface of the terminal board 21 facing the cap plate 10, and the sealing member 23 can also be positioned by providing the accommodation groove 14 on the terminal board 21.

In this embodiment, the sealing member 23 is in close contact with the terminal board 21 of the first electrode terminal, the fixing member 22 the cap plate 10 and the lower insulator at the same time. Therefore, the sealing member 23 may be evenly pressed so that the sealing member 23 may fully fill the space of the accommodation groove 14. Thus it is possible to further enhance the sealing effect of the sealing member 23. Also, as the sealing member 23 is disposed outside the shell, the contact of the sealing member 23 with the electrolyte inside the shell can be avoided so that the sealing member 23 can be prevented from swelling.

Of course, specific shape of the sealing member 23 is not limited in the embodiments of the present disclosure. In other embodiments, the sealing member 23 may also be rectangular or in other shapes. Of course, the accommodation groove 14 for the cap plate 10 is required to be in form-fitting with the sealing member 23. In addition, in some embodiments, the fixing member 22 and the sealing member 23 may also be disposed in an integral structure. Of course, in this case, both sealing function and hardness are required for the material of the fixing member 22.

As shown in FIG. 1, the wiring board 500 is located inside the shell 200. The secondary battery 1 has two wiring boards 500 which are respectively disposed corresponding to the positive electrode plate and the negative electrode plate (as shown in FIG. 1) and respectively connected between the first electrode terminal and the first electrode plate as well as between the second electrode terminal and the second electrode plate. In other words, the two terminal blocks 500 are respectively used for connections between a positive electrode terminal and the positive electrode tab (the first electrode tab 310) and between a negative electrode terminal and the negative tab (the second electrode tab 320). Further, the structure of the wiring board 500 will be illustrated taking the wiring board 500 connected between the first electrode terminal and the first electrode plate as an example.

Figure 7:
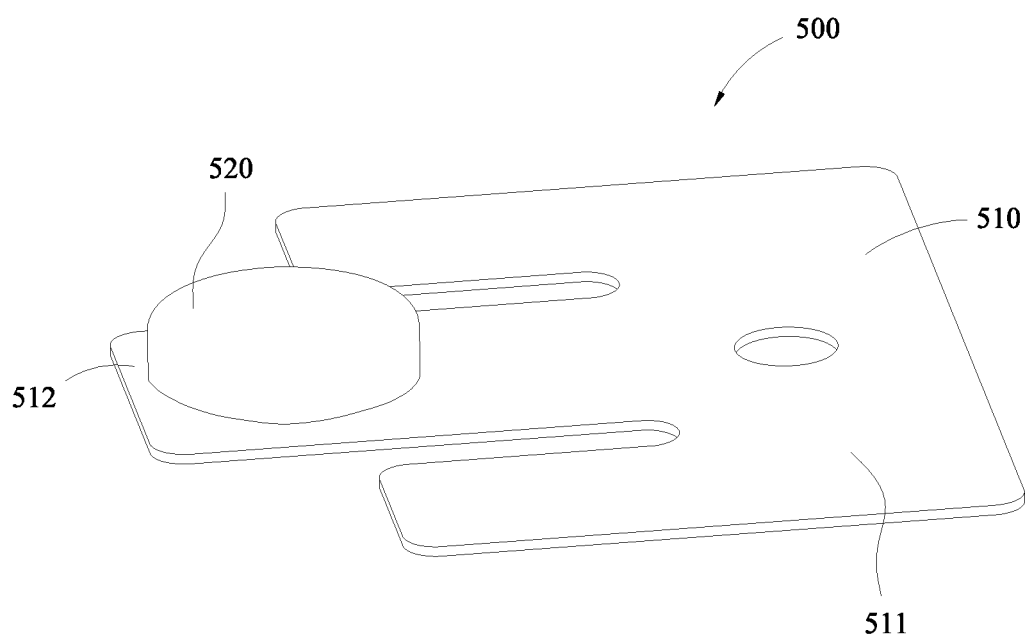
FIG. 7 is a schematic stereogram of a structure of a wiring boarding according to an embodiment of the present disclosure.
Figure 8:
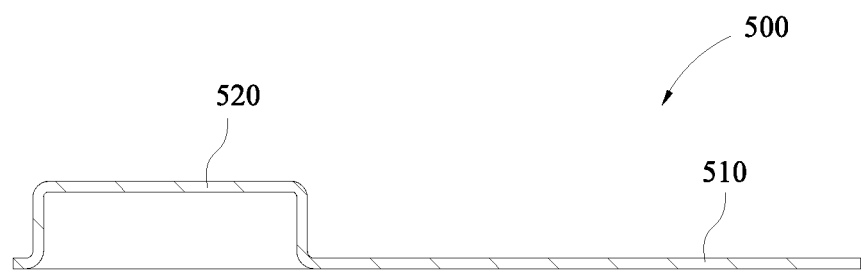
FIG. 8 is a schematic cross-sectional diagram of the structure of the wiring boarding in FIG. 7 taken along longitudinal direction.

FIG. 7 is a schematic stereogram of a structure of a wiring boarding 500 according to an embodiment of the present disclosure; and FIG. 8 is a schematic cross-sectional diagram of the structure of the wiring boarding 500 in FIG. 7 taken along longitudinal direction. It should be noted that the wiring board 500 in the cross-sectional view of FIG. 5 is the same as the wiring board 500 in FIG. 7 and FIG. 8.

As shown in FIG. 5, FIG. 7 and FIG. 8, according to an embodiment of the present disclosure, the wiring board 500 includes a main body portion 510 and an extension portion 520 connected to the main body portion 510. The main body portion 510 is located at a side of the lower insulator 40 away from the cap plate 10 and used to connect with the first electrode tab 310 electrically. The main body portion 510 can be electrically connected to the first electrode tab 310. The extension portion 520 may extend into the electrode lead-out hole 11 and be electrically connected to the first electrode terminal. As a result, the first electrode terminal can be electrically connected to the positive electrode plate, and first electrode terminal does not exceed beyond a surface of the lower insulator 40 away from the cap plate 10 (i.e., the lower surface of the lower insulator 40) in the direction from the cap plate 10 to the lower insulator 40. In an embodiment, the main body portion 510 includes a base plate 511 and a wing plate 512. The substrate 511 is formed in a plate-like structure, and the substrate 511 extends in a direction in parallel with the cap plate 10. Of course, the "in parallel with" herein are not strictly parallel. That is, during specific implementations, it is allowed that there is error in parallelism between the base plate 511 and the cap plate 10, which, however, would not affect substantial parallelism between the base plate 511 and the cap plate 10. The wing plate 512 is formed in a strip plate-like structure that extends outwardly substantially from the center of an edge of the base plate 511. Thus, the base plate 511 can be electrically connected to the first electrode tab 310 (i.e., electrically connected to the first electrode plate).

For example, the extension portion 520 is a protrusion provided on a surface of the main body portion 510 at a side close to the cap plate 10. As shown in FIG. 7 and FIG. 8, in the embodiment, a protrusion is provided on the wing plate 512, and thus a concave portion is formed on a surface of the wing plate 512 at a side away from the cap plate 10. That is, the protrusion includes a top wall and an annular side wall connected to the top wall, such that the protrusion is open at the side of the wing plate 512 away from the cap plate 10. In an exemplary embodiment, when the main body portion 510 and the extension portion 520 are in an integral structure, the extension portion 520 may be a cylindrical protrusion formed on the wing plate 512 by stamping molding. In this way, the main body portion 510 can be fitted to the surface of the lower insulator 40 at a side away from the cap plate 10, so that the extension portion 520 can extend into the electrode lead-out hole 11 to be in contact with the first electrode terminal and the extension portion 520 can be welded to the first electrode terminal.

Since the base plate 511 has a plate-like structure, when the first electrode tab 310 of the electrode assembly 300 is connected to the base plate 511, the first electrode tab 310 needs to be bent so that the first electrode tab 310 may be connected with the base plate 511 through the bending surface (as shown in FIG. 1). For example, the first electrode tab 310 may be connected to the base plate 511 by ultrasonic welding. Of course, in the present embodiment, since the main body portion 510 is also provided with an extension plate respectively on each of two sides of the wing plate 512, two or more sets of the electrode assemblies 300 may be connected to the main body portion 510 at the same time, so that the shell 200 of each secondary battery 1 can include at least two electrode assemblies 300. Since the connection manner between the first electrode tab 310 of the electrode assembly 300 and the wiring board 500 is simple, assembly efficiency of the secondary battery 1 can be effectively improved.

The extension portion 520 is formed on the wiring board 500 by stamping a protrusion such that the wiring board 500 can extend into the electrode extraction hole 11 to electrically connect with the first electrode terminal without the first electrode terminal being provided with other structure on the surface of the cap plate 10 at a side facing the shell 200 to connect electrically with the wiring board 500. That is, the surface of the first electrode terminal facing the inside of the shell 200 may be disposed to not exceed the lower surface of the cap plate 10. It is possible to reduce the occupation of the internal space of the shell 200 and effectively increase the energy density of the secondary battery. The structure and processing of the wiring board 500 is simple. The wiring board 500 may be made by simple cutting and stamping. Therefore, the processing cost of the secondary battery 1 can be reduced, and the difficulty in processing of the secondary battery 1 can be reduced.

Figure 9:
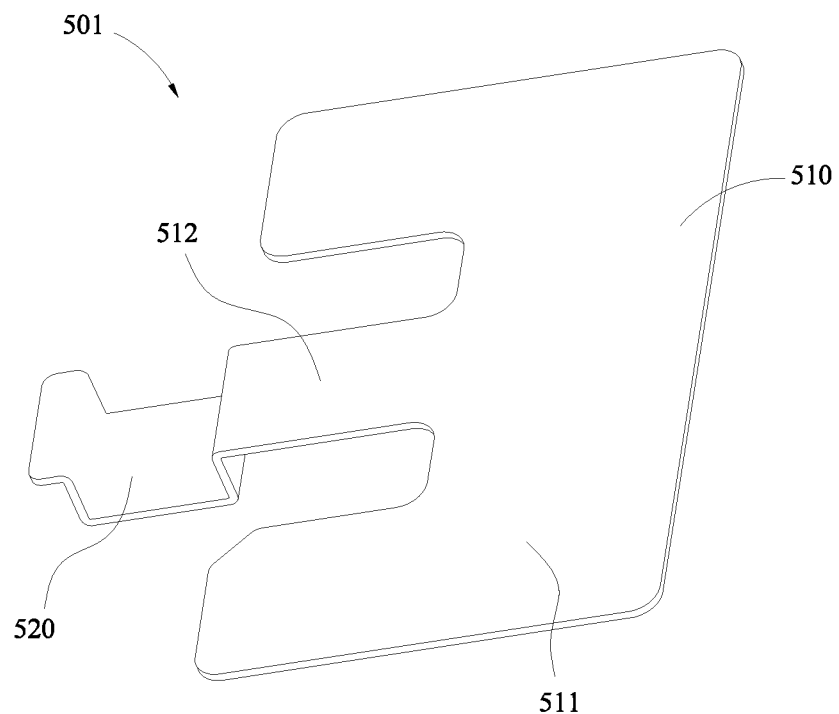
FIG. 9 is a schematic stereogram of a structure of a wiring boarding of a secondary battery according to another specific example of the embodiments of the present disclosure.

In addition, since welding may generate welding joint and welding slag, which may reduce flatness of the upper surface of the terminal board 21 (i.e., the surface away from the cap plate 10). To avoid this problem, the thickness of the terminal board 21 is required to be greater than that of the extension portion 520, the terminal board 21 and the extension portion 520 are connected by laser welding, the laser is emitted from the side of the cap plate 10 away from the terminal board 21, and the laser penetrates a part of the terminal board 21 and the extension portion 520, so that a welding joint is formed between the terminal board 21 and the extension portion 520. In this case, the upper surface of the terminal board 21 remains flat. FIG. 9 is a schematic stereogram of a structure of a wiring boarding 501 of a secondary battery 1 according to another specific example of the embodiments of the present disclosure. In this embodiment, the same components as those in the wiring board 500 shown in FIG. 7 and FIG. 8 described above are illustrated by the same reference numerals, and the same description will not be repeated here. As shown in FIG. 9, the wiring board 501 in this embodiment also includes a main body portion 510 and an extension portion 520. The extension portion 520 is also a protrusion formed on a wing plate 512 of the main body portion 510, and thus a concave portion is formed at the side of the wing plate 512 away from the cap plate 10 due to the protrusion. The difference with the wiring board 500 in the above embodiments is in that the protrusion includes a top wall and two side walls connected to the top wall and facing each other so that the concave portion is open at a side of the wing plate 512 away from the cap plate 10 and two sides that are adjacent to this side and opposite to each other. Thus, the gas generated during use of the secondary battery 1 can be stored by the concave portion (i.e., the interior of the shell 200 can contain more gas) so that it is possible to reduce the risk of the rupture disc in the anti-explosion assembly 16 being damaged by the force from the gas generated in the shell 200 and the service life of rupture disc can be improved.

In addition, when the main body portion 510 and the extension portion 520 are in an integrated structure, the extension portion 520 may be a bent protrusion formed on the wing plate 512 by stamping molding. That is, when viewed in the horizontal direction, the main body portion 510 provided with the extension portion 520 is disposed in an n-shape. In this way, the main body portion 510 can be fitted to the surface of the lower insulator 40 at a side away from the cap plate 10 so that the extension portion 520 can extend into the electrode lead-out hole 11 and be welded with the first electrode terminal. In addition, in another optional embodiment, the wiring board 501 may further be disposed in such a way that the extension portion 520 includes a top wall and a side wall connected with the top wall, such that the concave portion is open at a side of the wing plate 512 away from the cap plate 10 and three sides adjacent to this side. That is, the main body portion 510 provided with the extension portion 520 is disposed in a z-shape when viewed in the horizontal direction.

Figure 10:
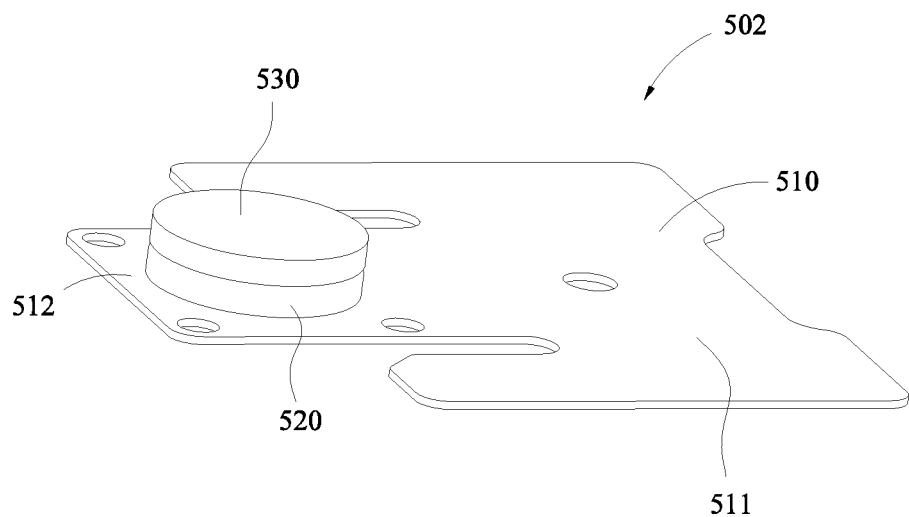
FIG. 10 is a schematic stereogram of a structure of a wiring boarding of a secondary battery according to yet another specific example of the embodiments of the present disclosure.

FIG. 10 is a schematic stereogram of a structure of a wiring boarding 502 of a secondary battery 1 according to yet another specific example of the embodiments of the present disclosure. In this embodiment, the same components as those in the wiring board 500 shown in FIG. 7 and FIG. 8 described above are illustrated by the same reference numerals, and the same description will not be repeated here. As shown in FIG. 10, the wiring board 502 in this embodiment also includes a main body portion 510 and an extension portion 520. The extension portion 520 is also a protrusion formed on a wing plate 512 of the main body portion 510, and thus a concave portion is formed at the side of the wing plate 512 away from the cap plate 10 due to the protrusion.

In this embodiment, the difference between the wiring board 502 and the wiring board 500 in the above embodiments is in that the main body portion 510 and the extension portion 520 are in separate structures, that is, the extension portion 520 further includes a conductive block 530. In other words, the extension portion 520 in the embodiment includes two parts: the protrusion and the conductive block 530. The protrusion is formed on the main body portion 510 in the same manner as that in the above embodiments. The conductive block 530 has a solid structure and is stacked on the protrusion. By providing the conductive block 530, copper-aluminum conversion between the second electrode terminal and the second electrode tab 320 can be facilitated for the second electrode terminal which is the negative electrode terminal.

In order to increase welding strength between the busbar and the first electrode terminal and between the second electrode terminal and the busbar, it is usually necessary to ensure that the portions where the first electrode terminal and the second electrode terminal are connected to the busbar are made of the same base metal as the busbar. Specifically, in this embodiment, for example, the bus bar is made of aluminum. Correspondingly, the terminal boards 21 of each of the first electrode terminal and the second electrode terminal is made of aluminum. Since the second electrode tab 320 of the electrode assembly 300 is made of copper, the main body portion 510 of the wiring board 502 connected to the second electrode tab 320 is made of copper, and the protrusion integrally formed on the main body portion 510 is also made of copper.

In order to facilitate welding connection between the protrusion which is made of copper and the terminal board 31 of the second electrode terminal which is made of aluminum, a conductive block 530 made of aluminum may be provided between the protrusion and the terminal board 21. Since the top wall of the protrusion is thin and thickness of the conductive block 530 may be small, the conductive block 530 and the protrusion may be first connected by ultrasonic welding. Next, the extension portion 520 including the protrusion and the conductive block 530 extends into the electrode lead-out hole 11, and the terminal board 31 of the second electrode terminal and the conductive block 530 are connected by laser welding (in this case, laser is emitted from the side of the cap plate 10 close to the terminal board 21, and the laser penetrate a part of the conductive block 530 and the terminal board 21) to obtain sufficient connection strength. As such, copper-aluminum conversion between the second electrode terminal and the second electrode tab 320 can be achieved through the wiring board 502, so that the connecting between the wiring board 502 and the second electrode terminal and between the wiring board 502 and the second electrode tab 320 can be simplified. The connection strength between the second electrode terminal and the second electrode tab 320 can be increased, and work reliability of the secondary battery can be increased.

In addition, in some embodiments, the first electrode terminal may include not only the terminal board 21, but also a boss (not shown in the figures) disposed at a side of the terminal board 21 close to the cap plate 10. The boss may extend into the electrode lead-out hole 11. In the case that the second terminal board 212 includes a boss, if the thickness of the boss does not exceed beyond the lower surface of the lower insulator 40, it will not occupy the space inside the shell 200. By providing a boss on the first electrode terminal, the first electrode terminal may extends into the electrode lead-out hole 11 through the boss and be welded to the extension portion 520 of the wiring board in any of the above embodiments.

Figure 11:
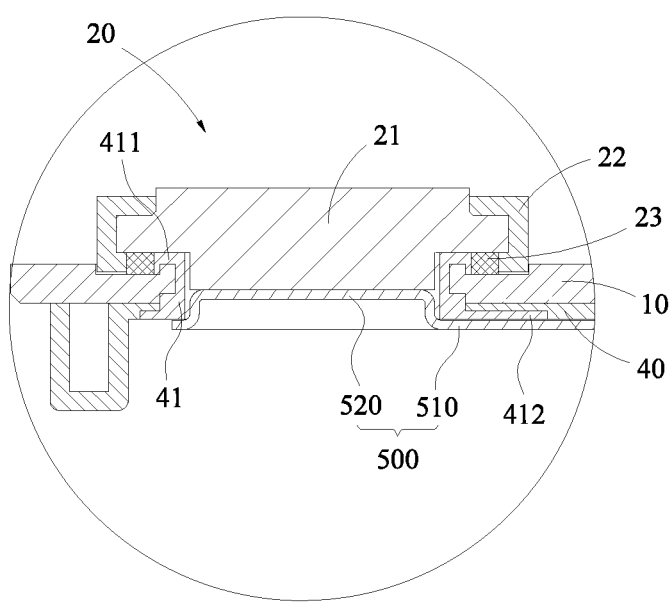
FIG. 11 is a schematic diagram of a structure of a terminal assembly according to another embodiment of the present disclosure.

FIG. 11 is a schematic diagram of a structure of a terminal assembly 20 according to another embodiment of the present disclosure. As shown in FIG. 11, in this embodiment, the same components as those in the above embodiments are illustrated by the same reference numerals and the components which have been described in detail will not be repeated here. In the embodiment, the first insulator 41 in the secondary battery is different from the first insulator 41 in the above embodiments in that the first insulator 41 and the lower insulator are in separate structures.

Illustratively, taking the first insulator 41 disposed at the side of the terminal assembly 20 as an example, the first insulator 41 includes a body portion, a first engaging portion 411, and a second engaging portion 412. The body portion is located in the electrode lead-out hole 11 and is attached to the inner wall of the electrode lead-out hole 11 so as to insulate the first electrode terminal and the wiring board 500 which are located in the electrode lead-out hole 11 from the cap plate 10. The first engaging portion 411 is an annular convex edge that is disposed on the edge of an end of the body portion close to the terminal board 21 and extends radially outward. An end face of the first engaging portion 411 facing the cap plate 10 is provided with an annular groove. An annular convex edge is disposed on the cap plate 10 adapted to the groove of the first engaging portion 411. After the body portion of the first insulator 41 is disposed in the electrode lead-out hole 11, the convex edge and the groove of the first engaging portion 411 are engaged with each other so as to fix the first insulator 41 in the electrode lead-out hole 11.

The second engaging portion 412 of the first insulator 41 is also an annular convex edge. The lower insulator 40 is provided with a through hole, and the first insulator 41 passes through the through hole. The second engaging portion 412 is disposed at a side of the first insulator 41 away from the cap plate 10 and extends radially outward. As a result, edge of the through hole of the lower insulator 40 is covered by the second engaging portion 412 to fix the lower insulator 40 to the first insulator 41 and further fix the lower insulator 40 to the side of the cap plate 10 facing the inside of the shell 200.

Of course, in an optional embodiment, it is also possible to fix the lower insulator 40 to the cap plate 10 only by the first engaging portion 411 of the first insulator 41 being abutted against an end face of the cap plate 10 at a side close to the terminal board 21.

In the above embodiments, the main body portion 510 and the extension portion 520 are in an integral structure, but the embodiments of the present disclosure are not limited thereto. In other embodiments, the main body portion 510 and the extension portion 520 may also be in separate structures. In this case, the main body portion 510 and the extension portion 520 may be connected to each other by welding. In addition, in the above embodiments, the extension portion 520 is disposed on the wing plate 512, which lead to a more flexible connecting operation, but the embodiments of the present disclosure are not limited in this respect. In other embodiments, the extension portion 520 may also be directly disposed on the base plate 511. That is, the main body portion 510 is disposed as an integral plate-like structure.

According to another embodiment of the present disclosure, there is further provided a battery module including a busbar (not shown) and the secondary battery 1 of any of the above embodiments. The busbar is welded to the terminal board 21 of the secondary battery 1.

The disclosure may be embodied in other specific forms without departing from the spirit and essential characteristics thereof. The embodiments discussed therefore should be considered in all aspects as illustrative and not restrictive. The scope of the disclosure is defined by the appended claims rather than by the foregoing description, and those modifications falling within the meaning and equivalents of the claims are thus intended to be embraced by the scope of the disclosure. Different technical features in different embodiments may be combined to obtain beneficial effects. Other variations of the described embodiments can be understood and practiced by those skilled in the art upon studying the drawings, the specification and the claims herein.

What is claimed is:

1. A secondary battery, comprising:
a shell having an opening;
an electrode assembly which is accommodated in the shell, wherein the electrode assembly comprises a first electrode plate, a second electrode plate, and a separator disposed between the first electrode plate and the second electrode plate;
a cap assembly including a cap plate and a first electrode terminal, wherein the cap plate covers the opening and has an electrode lead-out hole, and the first electrode terminal includes a terminal board, and wherein the terminal board is located at a side of the cap plate and covers the electrode lead-out hole;
a lower insulator located at a side of the cap plate away from the terminal board; and
a wiring board which includes a main body portion and an extension portion connected to the main body portion, wherein the main body portion is located at a side of the lower insulator away from the cap plate and connected to the first electrode plate, and the extension portion extends into the electrode lead-out hole and connected to the first electrode terminal, and wherein the first electrode plate is electrically connected to the first electrode terminal through the wiring board, and the first electrode terminal does not extend beyond a surface of the lower insulator away from the cap plate in a direction from the cap plate to the lower insulator,
wherein the extension portion includes a protrusion disposed at a side of the main body portion close to the cap plate, wherein the protrusion is connected to the first electrode terminal, and wherein a concave portion is formed at a side of the main body portion away from the cap plate by forming the protrusion.

2. The secondary battery of claim 1, wherein the main body portion is sheet-like and extends in a direction parallel to the cap plate.

3. The secondary battery of claim 2, wherein the main body portion and the extension portion are in an integral structure.

4. The secondary battery of claim 1, wherein the protrusion comprises a top wall and an annular side wall connected to the top wall, such that the concave portion is open at the side of the main body portion away from the cap plate.

5. The secondary battery of claim 1, wherein the protrusion comprises a top wall and two side walls which are connected to the top wall and opposite to each other, such that the concave portion is open at the side of the main body portion away from the cap plate and open at two sides that are adjacent to this side and opposite to each other.

6. The secondary battery of claim 1, wherein the protrusion comprises a top wall and a side wall connected with the top wall, such that the concave portion is open at the side of the main body portion away from the cap plate and open at three sides adjacent to this side.

7. The secondary battery of claim 1, wherein the main body portion comprises a base plate and a wing plate extended from an edge of the base plate, wherein the base plate is connected to the first electrode plate, and the extension portion is disposed on the wing plate.

8. The secondary battery of claim 1, wherein the main body portion and the extension portion are in separate structures, and the extension portion further comprises a conductive block, and wherein the conductive block has a solid structure and is welded with the main body portion and the terminal board.

9. The secondary battery of claim 1, wherein the first electrode terminal is composed of the terminal board, and wherein the terminal board is plate-like.

10. The secondary battery of claim 9, wherein thickness of the terminal board is greater than that of the extension portion, and the terminal board and the extension portion are connected by laser welding which forms a weld joint, and wherein the weld joint does not exceed beyond a surface of the terminal board away from the cap plate in a direction from the cap plate to the terminal board.

11. The secondary battery of claim 1, further comprising a sealing member which is provided between the terminal board and the cap plate.

12. The secondary battery of claim 1, wherein the first electrode terminal further comprises a boss connected with the terminal board, and wherein the boss extends into the electrode lead-out hole and is welded with the extension portion.

13. The secondary battery of claim 1, further comprising a fixing member and a connecting member, wherein the fixing member is fixed to the cap plate through the connecting member, and an outer peripheral surface of the first electrode terminal is at least partially surrounded by the fixing member to fix the first electrode terminal to the fixing member.

14. The secondary battery of claim 13, wherein the connecting member comprises a nail body and a limiting portion which are connected with each other, an outer peripheral surface of the limiting portion protrudes from an outer peripheral surface of the nail body, an end of the nail body far away from the limiting portion is fixed on the cap plate, and the limiting portion is engaged with the fixing member.

15. The secondary battery of claim 13, wherein the connecting member comprises a first connecting plate, and wherein a part of the first connecting plate is embedded in the fixing member and engaged with the fixing member, and another part of the first connecting plate is welded with the cap plate.

16. The secondary battery of claim 13, wherein the connecting member comprises an undercut and an undercut hole, wherein the undercut hole is provided on a surface of the cap plate facing the fixing member, and aperture of the undercut hole is increased along a direction from the fixing member to the cap plate, the undercut is connected with the fixing member and is in form-fitting with the undercut hole, and the undercut is fitted with the undercut hole.

17. The secondary battery of claim 1, wherein the first electrode plate comprises a coating area coated by active materials and a first electrode tab extending from the coating area, and wherein the first electrode tab is bent and connected with the main body portion.

18. The secondary battery of claim 1, further comprising a first insulator, wherein the first insulator comprises a body portion, a first engaging portion, and a second engaging portion, and wherein the first engaging portion is located at a side of the body portion close to the terminal board, the second engaging portion is located at a side of the body portion away from the first engaging portion, the body portion is accommodated in the electrode lead-out hole, the first engaging portion is fitted with the cap plate to fix the first engaging portion to the cap plate, the lower insulator is provided with a through hole, the first insulator passes through the through hole, the second engaging portion is located at a side of the lower insulator away from the cap plate, and an outer peripheral surface of the second engaging portion protrudes from an inner wall of the through hole to fix the lower insulator to the first insulator.

19. The secondary battery of claim 18, wherein the first engaging portion has a groove, a flange is provided at a side of the cap plate facing the first engaging portion, and the groove is fitted with the flange.

20. A battery module, comprising:

a busbar; and the secondary battery of claim 1, wherein the busbar is welded to the terminal board.

* * * * *